US009026922B2

(12) United States Patent
Dhaliwal et al.

(10) Patent No.: US 9,026,922 B2
(45) Date of Patent: May 5, 2015

(54) METHOD AND SYSTEM OF GENERATING AND MANAGING DIGITAL DREAMBOARDS

(71) Applicants: Anita Rani Dhaliwal, Irvine, CA (US); Erin Mester, San Diego, CA (US); Ash Kumra, Irvine, CA (US)

(72) Inventors: Anita Rani Dhaliwal, Irvine, CA (US); Erin Mester, San Diego, CA (US); Ash Kumra, Irvine, CA (US)

(*) Notice: Subject to any disclaimer, the term of this patent is extended or adjusted under 35 U.S.C. 154(b) by 38 days.

(21) Appl. No.: 13/655,439

(22) Filed: Oct. 18, 2012

(65) Prior Publication Data
US 2014/0115497 A1    Apr. 24, 2014

(51) Int. Cl.
*G06Q 10/10* (2012.01)
*G06F 3/048* (2013.01)

(52) U.S. Cl.
CPC ............................... *G06F 3/048* (2013.01)

(58) Field of Classification Search
CPC ............ G06F 8/34; G06F 9/443; G06F 8/38; G06Q 10/10
See application file for complete search history.

(56) References Cited

U.S. PATENT DOCUMENTS

| | | | |
|---|---|---|---|
| 2002/0073005 A1* | 6/2002 | Welnicki et al. | 705/35 |
| 2006/0168543 A1* | 7/2006 | Zaner-Godsey et al. | 715/835 |
| 2006/0184409 A1* | 8/2006 | Bangel et al. | 705/8 |
| 2007/0072156 A1* | 3/2007 | Kaufman et al. | 434/236 |
| 2008/0249818 A1* | 10/2008 | Olliphant et al. | 705/7 |
| 2009/0319288 A1* | 12/2009 | Slaney et al. | 705/1 |
| 2010/0054601 A1* | 3/2010 | Anbalagan et al. | 382/180 |
| 2010/0241559 A1* | 9/2010 | O'Connor et al. | 705/39 |
| 2012/0022949 A1* | 1/2012 | George | 705/14.66 |
| 2012/0124482 A1* | 5/2012 | Ray et al. | 715/751 |
| 2012/0136762 A1* | 5/2012 | Wissenbach | 705/30 |
| 2012/0221345 A1* | 8/2012 | McClure et al. | 705/2 |
| 2014/0033085 A1* | 1/2014 | Kopetsky et al. | 715/763 |

* cited by examiner

*Primary Examiner* — Matt Kim
*Assistant Examiner* — Mahelet Shiberou

(57) ABSTRACT

In one embodiment, a computer-implemented method includes the step of providing a graphical user interface configured to accept user input. A user-indicated dream symbol is obtained. A user-provided intention is received. The user-provided dream symbol and the user-provided intention are associated in a digital dreamboard. Optionally, the digital dreamboard is published to an online social network. Online donations from other members of the online social network related to fulfill the user-provided intention can be obtained. Two or more digital dreamboards may be merged together. A user can invite friends to view the digital dreamboard. A user can indicate a dream symbol by tagging another dream symbol in another user's digital dreamboard.

13 Claims, 25 Drawing Sheets

Anita Rani's Latest Dream Activity

Anita Rani updated the status of a Family & Friends Dream

Ash Kumra commented on Anita Rani Chatwal's Health Dream

Anita Rani Chatwal added a new Travel Dream

Ash Kumra commented on Anita Rani Chatwal's Career & Life Path Dream

Anita Rani Chatwal added a new Career & Life Path Dream

METHOD AND SYSTEM OF GENERATING AND MANAGING DIGITAL DREAMBOARDS

CROSS-REFERENCE TO RELATED APPLICATIONS

This application claims priority provisional application No. 61/548,928 titled METHOD AND SYSTEM FOR IDENTIFYING A USER'S CURRENT LEVEL OF SATISFACTION IN ONE OR MORE ASPECTS OF A USER'S LIFE, GUIDE THE USER IN CREATING AND/OR VISUALIZING THE USER'S IDEAL BALANCED DREAM LIFE, AND PROVIDE THE TOOLS TO ASSIST THE USER TO BRING THE DREAM(S) TO FRUITION and filed Oct. 19, 2011. This application is hereby incorporated by reference in its entirety.

BACKGROUND

1. Field

This application relates generally to generating and/or management of digital dreamboards.

2. Related Art

People may have dreams and aspirations they would like to fulfill. A dream or aspiration can be difficult to achieve without the assistance of a particular technique such as a dreamboard. A dreamboard can help a person envision various life goals and aspirations. A dreamboard can provide a daily reminder of one's goals.

At the same time, online social networks and crowdfunding websites have enabled people to gather in a collective effort of individuals who network and pool their resources. Current online social networks simply allow users to make connections and interact. Users may lack a platform that enables them to discover, share, and receive feedback on their dreams. Users can 'like' existing content, but are unable to share their particular dreams as represented in a digital dreamboard in an effective manner. Likewise, crowd funding is used in support of a wide variety of activities, including disaster relief, support of artists by fans, political campaigns, startup company funding, etc. However, it has yet to be applied to assisting fulfillment of dreams and aspirations as represented in a digital dreamboard context (e.g. a vision board).

BRIEF DESCRIPTION OF THE DRAWINGS

The present application can be best understood by reference to the following description taken in conjunction with the accompanying figures, in which like parts may be referred to by like numerals.

BRIEF SUMMARY OF THE INVENTION

Figure 1A:
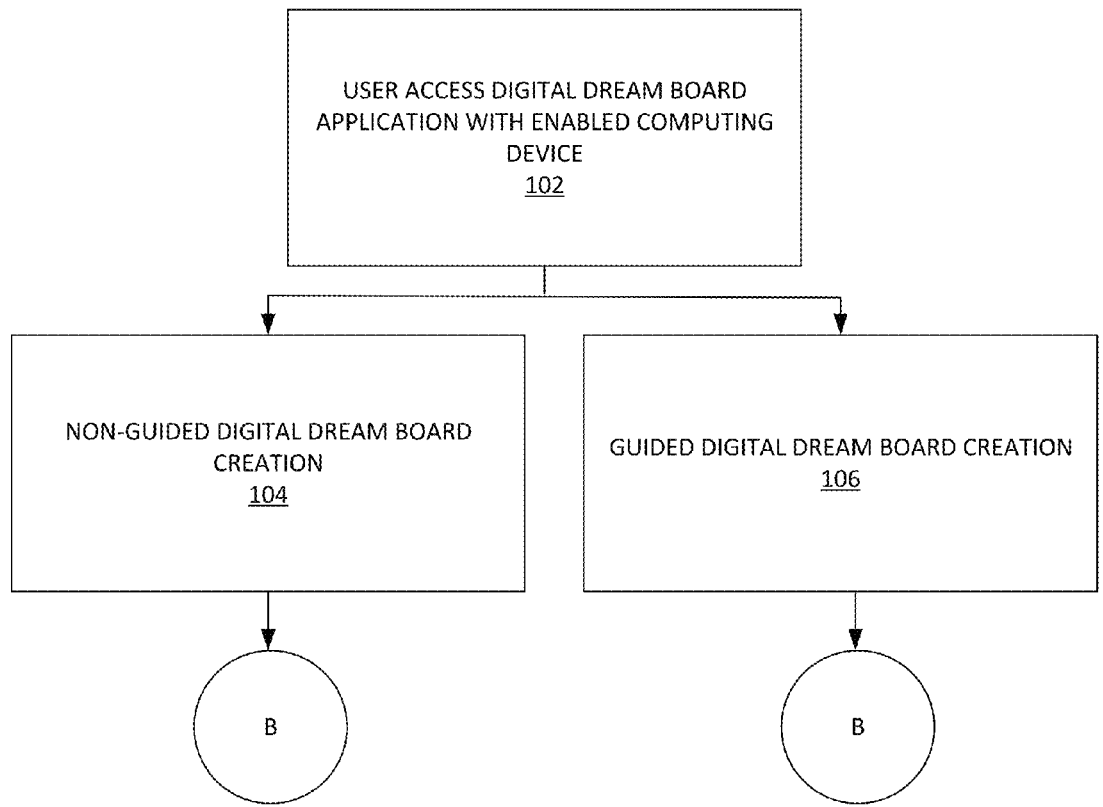
FIGS. 1A-B illustrate an exemplary process for generating and optimizing a digitalized dreamboard, according to some embodiments.

In one embodiment, a computer-implemented method includes the step of providing a graphical user interface configured to accept user input. A user-indicated dream symbol is obtained. A user-provided intention is received. The user-provided dream symbol and the user-provided intention are associated in a digital dreamboard.

Optionally, the digital dreamboard is published to an online social network. Online donations from other members of the online social network related to fulfill the user-provided intention can be obtained. Two or more digital dreamboards may be merged together. A user can invite friends to view the digital dreamboard. A user can indicate a dream symbol by tagging another dream symbol in another user's digital dreamboard.

DETAILED DESCRIPTION

Disclosed are a computerized a system, method, and article of manufacture for generating and managing digital dreamboards. Although the present embodiments have been described with reference to specific example embodiments, it will be evident that various modifications and changes may be made to these embodiments without departing from the broader spirit and scope of the particular example embodiment.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification can, but do not necessarily, all refer to the same embodiment.

Furthermore, the described features, structures, or characteristics of the invention can be combined in any suitable manner in one or more embodiments. In the following description, numerous specific details are provided, such as examples of programming, software modules, attendee selections, network transactions, database queries, database structures, hardware modules, hardware circuits, hardware chips, etc., to provide a thorough understanding of embodiments of the invention. One skilled in the relevant art can recognize, however, that the invention can be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs can or cannot strictly adhere to the order of the corresponding steps shown.

A. Exemplary Operations

Figure 1B:
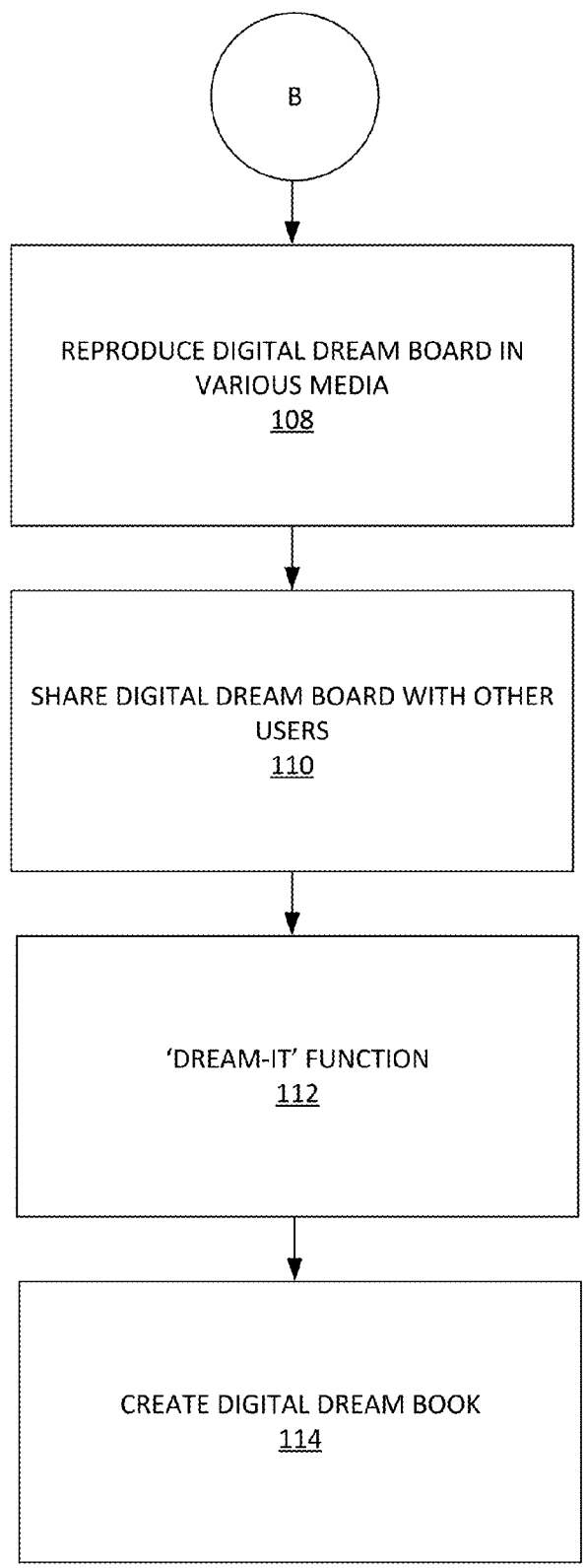

FIG. 1 illustrates an exemplary process 100 for generating and optimizing a digitalized dreamboard, according to some embodiments. In step 102 of process 100, a user can access a digital dreamboard (DDB) application with an enabled computing device. Step 102 can include various subprocesses such as a user registration process. An example registration process can include steps to create a user profile. A user may input identification information, user interest information, other demographic data, location data, personal data (birthdate, gender, school, status, etc.), and DDB profile name, items/services a user would like to purchase and/or use (e.g. a wish list), marital status, social network status updates, and the like. This user input can be used to suggest determine targeted advertisements and/or sponsors to display to a user. A DDB application can be a client-side application operating in a user's computing device. A DDB application can communicate with a DDB server. DDB server can include one or more processes for creation and/or management of DDBs of users. A DDB application can present various display elements for user input and/or DDBs.

Optionally, a DDB application and/or server can present interfaces to a user that enable the user to brainstorm ideas and/or obtain inspiration from other users (e.g. DDB system can include one or more online social networking services), build with community dreams, dreamboards, photos, photos from world wide web (anywhere on web) and/or select photos from such to add to their own digital dream box for use later in creating their dreamboard using a drag and drop feature. Users can select various elements for use later in creating their dreamboard. The DDB system can employ a drag and drop feature (and/or means of indication a user's intention to select an element) that can allow users to drag images from their digital dreambox directly onto their dreamboard in the same interface. The system can also show the user the user's digital dreambox alongside other interfaces shown by the DDB system, thus allowing users to add new images or select images to be added to their dreamboard by selecting the image and clicking 'add to dreamboard', and/or by simply double clicking the image, or through some other similar functionality. Additionally, step 102 can include sub-processes for providing users with tutorials, rules and/or other system procedures. Additionally, users can earn reward points for creating dreams, viewing dreamboard, community interaction, connecting with experts. Users can redeem for prizes.

Various DDB options can be provided through a digital medium such as a web page document (e.g. can be in an HTML format) communicated through a computer network such as the Internet. A DDB (e.g. vision board, dreamboard, goal board, dream intention board, scrap book, dream collage, goal collage, life map, intention board, intention collage, future goal board, mind map, life map, pin board, brainstorming tool, idea board) can include an organized visual representation of a user's dreams and goals. A digitalized dreamboard can include elements (e.g. visual, aural, dynamic) represent their desires, objectives, dreams and goals. A dreamboard can be a tool to guide a user's attention towards positive and productive thought processes. These elements can be formatted according to various hierarchies based on such factors as inspirational value to the user, pertinence to a particular to the user, and the like. Optionally, these elements can be formatted as a collage. In some embodiments, a dreamboard can include a digital version of such entities as a vision board, a mind map and/or goal map. Typically, a dreamboard can be formatted for presentation with a web browser on a display of a personal computing device (e.g. a personal computer, a lap top, a tablet computer). However, a dreamboard can also be formatted for display on other computing devices such as a mobile device, digital billboard, augmented reality devices, user-wearable goggles that include a display for digital elements, and the like. Moreover, in some embodiments, the dreamboard and/or various elements of a dreamboard can also be rendered in a format for printing onto a paper medium, screen savers, power-point presentations, inclusion on merchandise items (such as clothing, mugs, wall art, yoga mats) etc. Furthermore, dreamboards can include a particular theme such as for weddings, gift registries, dating, careers, chakras, physical fitness, body-image improvement, educational goals, business, ideal partner, romance, entrepreneurship, feng shui board, visual business plan, life plan, business vision board, user statements of appreciation, contests, story boards for movie scripts, fashion, parent/children collaborations, resume, creative acting reel, as well as others. A DDB can include a video-based dreamboard (e.g. each dream can be a video either uploaded or referenced via a hyperlink).

In one example, a DDB server can be configured to provide an online social network that enables a plurality of users to share DDBs, recommend DDBs, personal information, user comments, 'likes/luvs' of others posted content, comment on DDBs and/or elements thereof, manifestation tools, invite friends to view and/or interact with a specified DDB, share each specific dream category dream, donate to other users, create/share profiles, etc. with various other members of the online social network. For example, a user can share with public or private groups/circles that user creates and joins for more targeted support. A user can select circle/groups to join with similar like-minded goals/dreams/desires to encourage, share info, comment, uplift, etc. The DDB server could also be configured to provide various forums for experts (e.g. motivational speakers, health experts, life coaches, dreamboard coaches, yoga teachers, psychologists, and the like) to provide content that may be of interest to other users. For example, DDB server can enable coaching, guidance and support to help them unblock any obstacles from them achieving their goals or systematically guide them to help them achieve their goals. In another example, various users can be rated based on such factors as number of dreamboards, length of membership in the social network, number of followers, etc. These users can also provide advice to other users such as in the form of testimonials. For example, an application in the DDB server can algorithmically obtain statistical information about such aspects of the social network (such as user demographics, trending topics, dreamboard content) and provide this information to a pool of experts. In this way, relevant experts can be algorithmically selected and provided an opportunity to address issues relevant to a specified subsection of the social network's membership. In one example, a dreamboard can be used as a pre-questionnaire to coaches, psychologists, hypno-therapists, experts, life coaches, teachers, motivational speakers and more. In one embodiment, an expert can contribute in various ways such as inspirational interviews, wiki, community, articles, quick tips, blogs, and expert dreamboards. The DDB system can provide a means (e.g. a 'badge' icon) that distinguishes a particular user as an expert. It is further noted, that two or more users can collaboratively create a DDB.

DDB server can enable users to find like-minded individuals with similar interests, passions, desires, dreams, visions, goals, aspirations to locate like-minded user matches based on user data. This match-up system can be integrate with other social media profiles and/or third party match making companies as well as to augment to a user's other social media profiles. Third-party vendors can access user profiles and DDBs in order to determine product opportunities that can be sent to users (e.g. via text message, email, etc.).

Optionally, other users may be able to purchase merchandise for other linked members. The merchandise can include motivational content (e.g. a mug with a dreamboard image and/or a motivational saying). Moreover, the DDB server can provide personal examination tools for users. Example personal examination tools include online journals, dream interpretation applications, slide shows, reminder applications (e.g. can send an SMS/MMS text of a reminder), fields for input of personal aspirations and self-criticisms, and the like. A user can enable various share/privacy settings for this information (e.g. choose to share it with a dreamboard coach, close friends, etc.). Once this information has been shared, a user with whom the information is shared can be enabled to review and respond to the information. It is noted that information gathered about users and/or DDB-related information can be utilized by a DDB server system to provide suggestions such as digital photographs, other members to connect with, similar dreams, similar intentions, similar interests, products and services, love interests, experts to connect with and more.

In some embodiments, DDB themes can be expanded beyond self-help issues. For example, a user can design and optimize a world vision dreamboard that is focused on a particular cause that is of interest to the user. As with the other dreamboard optimization methods described herein, a web server can be configured to enable the user to share the world vision DDB with others in a specified online social network, acquire donations for the cause, generate merchandise related to the cause, receive expert advice apropos the cause and the like.

After a user has in step 102, a user can then choose a method to create a DDB. In step 104, a user can opt for non-guided method of creating a DDB. In this method, a DDB application can present a canvas object to the user with a computer display. The user can locate, identify and/or upload digital images to be associated with the DDB. Digital images can be identified and/or located by a variety of means such as via a social photo sharing website, a URL, an image bookmarking system and the like. A user can associate an intention (e.g. with text input, a drop down menu, radio buttons, check boxes, etc.) with an image.

Alternatively, in step 106, a user can selected a themed and/or guided DDB to develop. Themed DDBs can be oriented to such themes as: living a balanced life, developing entrepreneurial attributes, developing wealth, planning for a wedding, an ideal love, career development, a world vision and the like. In step 106, a user can perform a step by step questioning process to develop the ideal dream with a digital image and/or video. The digital image and/or video can then be associated with one or more intentions. A user can input intentions and/or select from a list of intentions provided by the DDB application. A user can repeat this process until they complete all or as many aspects of theme they feel necessary. A progress bar can be provided in the application view that can indicate a completion state of a particular themed DDB. The DDB can be enhanced with various enhancement elements such as frames, ribbons, thumb tacks, stickers, quotes, texts etc. In one example, a user can upload, embed, or reference another user profiles digital image and/or videos to a DDB server.

In step 108, a user can reproduce DDB in various media. For example, once dreamboard is completed, the DDB application can enable a user to create a slideshow of dreams, movies, screen savers, printed versions of dreamboard, merchandise with various views of the user's DDB(s) (e.g. clothing, cups, toys, etc.), visual computer screen, mobile phone screen views, and the like.

In step 110, a user can share DDB(s) with a specified community (e.g. family, social networking 'friends' and/or 'kindred souls'). The DDB application can include various display elements for user sharing and/or privacy controls. Optionally, a user can designate a particular DDB and/or subelements thereof as 'private' and thus available for viewing only by the user.

In step 112, selected users with permission to view/access a DDB can interact with it in various ways. A user can select an option to allow unfiltered members of the public to view a DDB. In one example, selected users can view, comment, like/luv, donate/gift/fund, follow, and/or share their own dreams. Users can select a general cause and/or specific charity organization to give a set amount or a percentage of money received from dream funding. Selected users can incorporate a specified element of another user's DDB for inspiration in their dreamboard by using 'Dream-It' function. The 'Dream-It' function can enable a viewing user to scroll through the on-line DDB community (and in some embodiments, the World Wide Web) and select digital images for use in his/her own DDB. These digital images can be stored in a digital dream box with or without intentions to later drag and drop onto the DDB. A user can also share 'Dream It' pictures on outside social media profiles (e.g. Facebook® Timeline®, Twitter®, LinkedIn® Profiles), blog posts, SMS/Phone messaging, and interactive smart television applications.

It is noted that the DDB system can also provide suggestions to members based on information each member has provided to the system (e.g. profile data, browsing data, 'dream it' actions data, user dream intentions, user interests, user tags and the like). Example suggests can include other members to connect with, dreams to review, relevant advice, content, videos etc. In some embodiments, the 'dream it' functionality can include additional functionalities including enabling a user can to take a digital photograph, tag the digital image with a 'dream it' status. A user can also associate an intention with the tagged digital image and/or include the digital image in a specified dreamboard and/or dream box.

In step 114, the DDB application can allow a user to designate a dream(s) as 'fulfilled'. A user can, they can review fulfilled dreams and create a digital dream book, slide show and/or dream video that showcases fulfilled dreams. A user can add associated content with the fulfilled dreams such as a story, a learned life lessons, comments/testimonials/feedback and/or support received from various social network connections that assisted in the process of fulfilling dreams.

In some embodiments, DDB views can be presented in a time-line format. Additionally, DDBs can be tagged with various metadata to assist a DDB search engine (e.g. can be in DDB server). Moreover, a DDB server can include a product module. The product module can determine various products/services that are related to the subject matter of a particular DDB element. The product module can then include hyperlinks to an online retailer's website in the DDB's GUI. It is further noted that in some embodiments, a user can create multiple DDBs in different or same topics (e.g. life, entrepreneurship, romance, and career) and then using a thumbnail to place on their main life dreamboard and link to more specific boards. These DDBs can be stored in a data store associated with a DDB server and accessible via a computer network. In some embodiments, DDB server can maintain an e-commerce product/service purchase feature that enables users to purchase products/services depicted by the DDB website.

Figure 2:
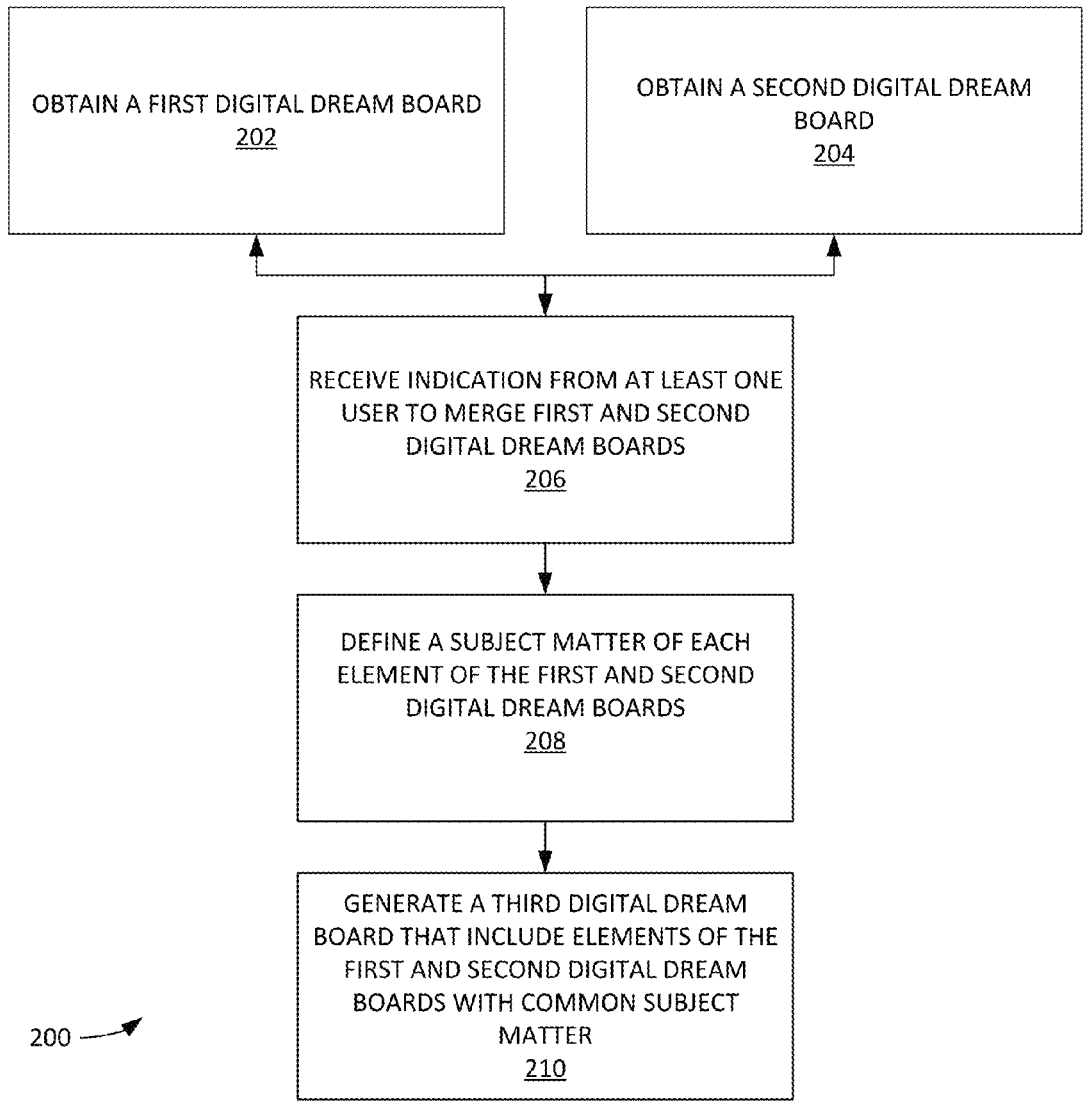
FIG. 2 depicts an example process of merging two or more digital dreamboards, according to some embodiments.

FIG. 2 depicts an example process 200 of merging two or more DDBs, according to some embodiments. In step 202 of process 200, a first DDB can be obtained (e.g. by a DDB merger process running in a DDB server). In step 204, a second DDB can be obtained. It is noted that in other examples n-number DDBs can be obtained. DDBs can be obtained by a DDB server when a user indicates a DDB merger operation with a DDB client operating on a user's computing device in step 206. For example, a user may be viewing two DDBs and indicate a 'drag and drop' operation of the first DDB into the second DDB. Upon receiving the merger indication from a user, step 208 is performed. In step 208, the DDB elements can be indexed and a subject matter of each DDB element defined. Various DDB attributes (e.g. metadata, labels, dreams, intentions and other content associated with element, etc.) can be utilized to define at least one subject matter of a DDB element. Once each element of the merging DDBs has been defined and indexed, the common elements can be determined. For example, elements with similar attributes can be determined to be substantially common elements. For example, an image of a woman doing yoga in a first DDB can be determine to be substantially common with an image of a man doing yoga in a second dreamboard based on the common activity. Common element matches can be done on a one-to-one, one-to-many and/or many-to-many basis. In one example, the system could prompt the user to determine which image to use in the merged dreamboard and/or suggest new similar images based on the commonality information being analyzed. The system could also merge dreamboards from many different users all at once based on certain criteria determined by the user such as merging dreamboards with common love dreams, people with common interests and dreams, etc. The system could show the user results ordered according to the most closely matched, or the results could be sorted by the user using other criteria such as how active the member is, how popular the member's dreamboards or dreams are, or other criteria could be envisioned. In step 210, a third DDB can be created that includes elements of the first and second DDBs with common subject matter. Couples can merge selected DDB to determine the commonality in their dreams. Business founders can merge selected DDB to find a commonality in their mission. It is noted that other methods of merging DDBs can be utilized as well. For example, other comparative metrics can be used in lieu of common attributes. In one example, complimentary subjects can be matched in lieu of common subjects. In another example, opposing subjects can be matched in lieu of common subjects.

Once a user has created a DDB with dreams and intentions, the DDB system can share it with various specified user social network connections (e.g. family, friends and kindred souls). The DDB system can include means whereby a social network connection can provide gifts/donations to apply towards the fulfillment of dreams indicated in shared DDB. The DDB system can include one or more systems for payments and money transfers to be made through the Internet. In one embodiment, a functionality can be included in the DDB application wherein any image element of a DDB can be communicated and/or displayed on a crowd funding site (ex: IndieGoGo®) and/or investment sourcing website (ex: www.AngelList.coM) when a user implements the "Dream It" functionality.

In one example, a user an input an intention that may require $500,000 to obtain. This data can be used to determine a set of local angel investors (ex: Tech Coast Angels), resources (ex: Live Plan from Palo Alto Software), and/or a specific fund raising mentor from DIA network. This example can utilize a geo-targeting type feature (e.g. user is in southern California, an entrepreneur and wants to raise $500,000).

Figure 3:
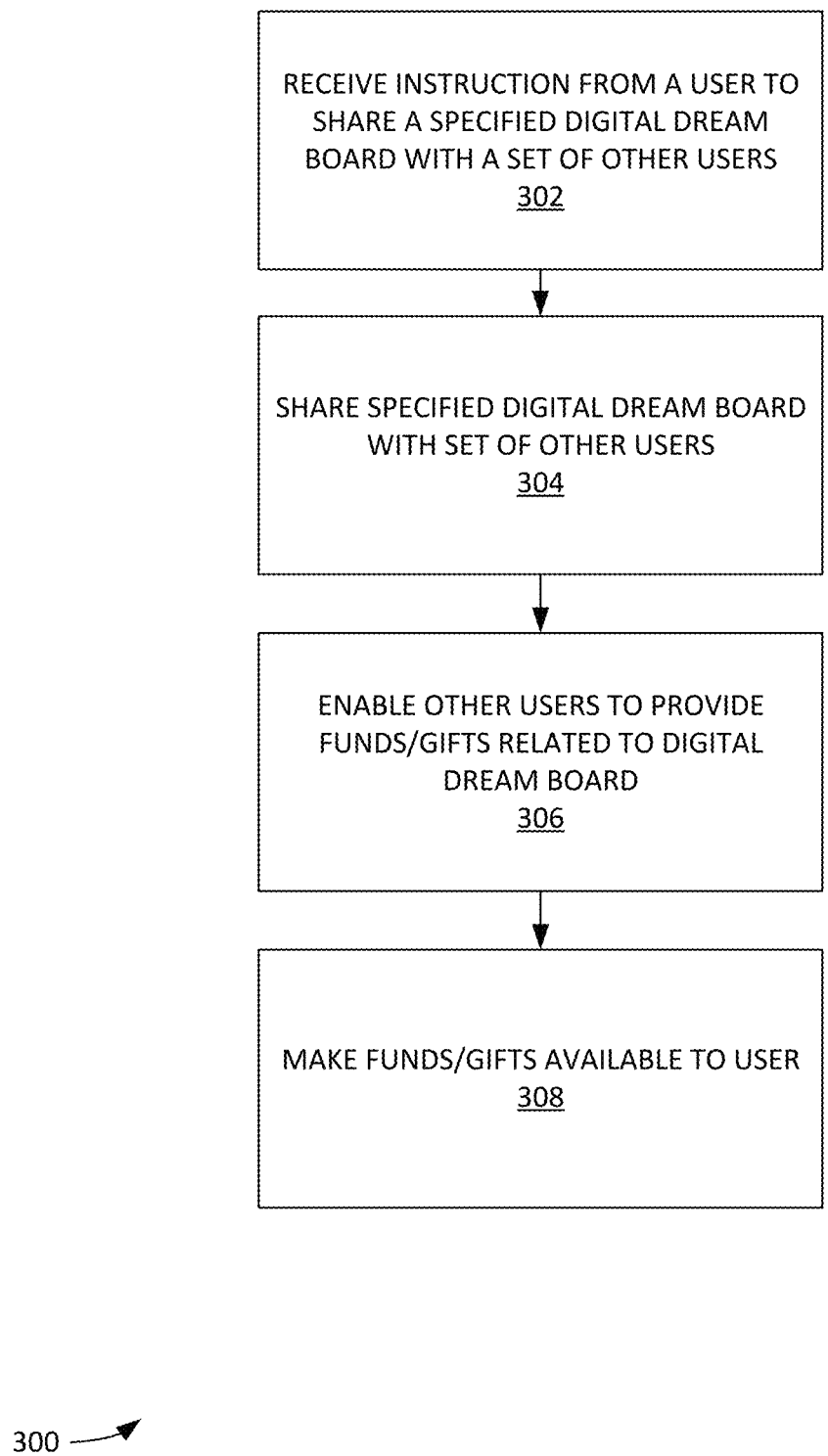
FIG. 3 illustrates an example process of enabling funding of an intention represented by a digital dreamboard (and/or an element of a digital dreamboard).

For example, FIG. 3 illustrates an example process 300 of enabling funding of an intention represented by a DDB (and/or an element of a DDB). In step 302 of process 300, an instruction is received from a user to share a specified DDB with a specified set of other users. The other users can include members of an online social networking group, a crowd funding website, and the like. In some embodiments, a user can specify elements of a DDB to share (e.g. images, intentions, etc.). In step 304, the DDB (and/or a specified element thereof) can be shared with the specified set of other users. In step 306, the other users are enabled to provide funds/gifts related to the DDB. For example, an image in the user's digital dream can include a dream vacation. The other users can contribute funds and/or related items (e.g. luggage, clothing, etc.) to assist the user in fulfilling the dream vacation. In step 308, DDB system can make the funds/gifts available to the user. The DDB system can include various entities (e.g. auditing programs, escrow programs, and the like) to ensure that the funds are applied to the appropriate intention/dream. It is noted, that in some embodiments, any member of the public can access process 300 when a DDB is set in an 'available to the public' state.

Exemplary Environment and Architecture

Figure 4:
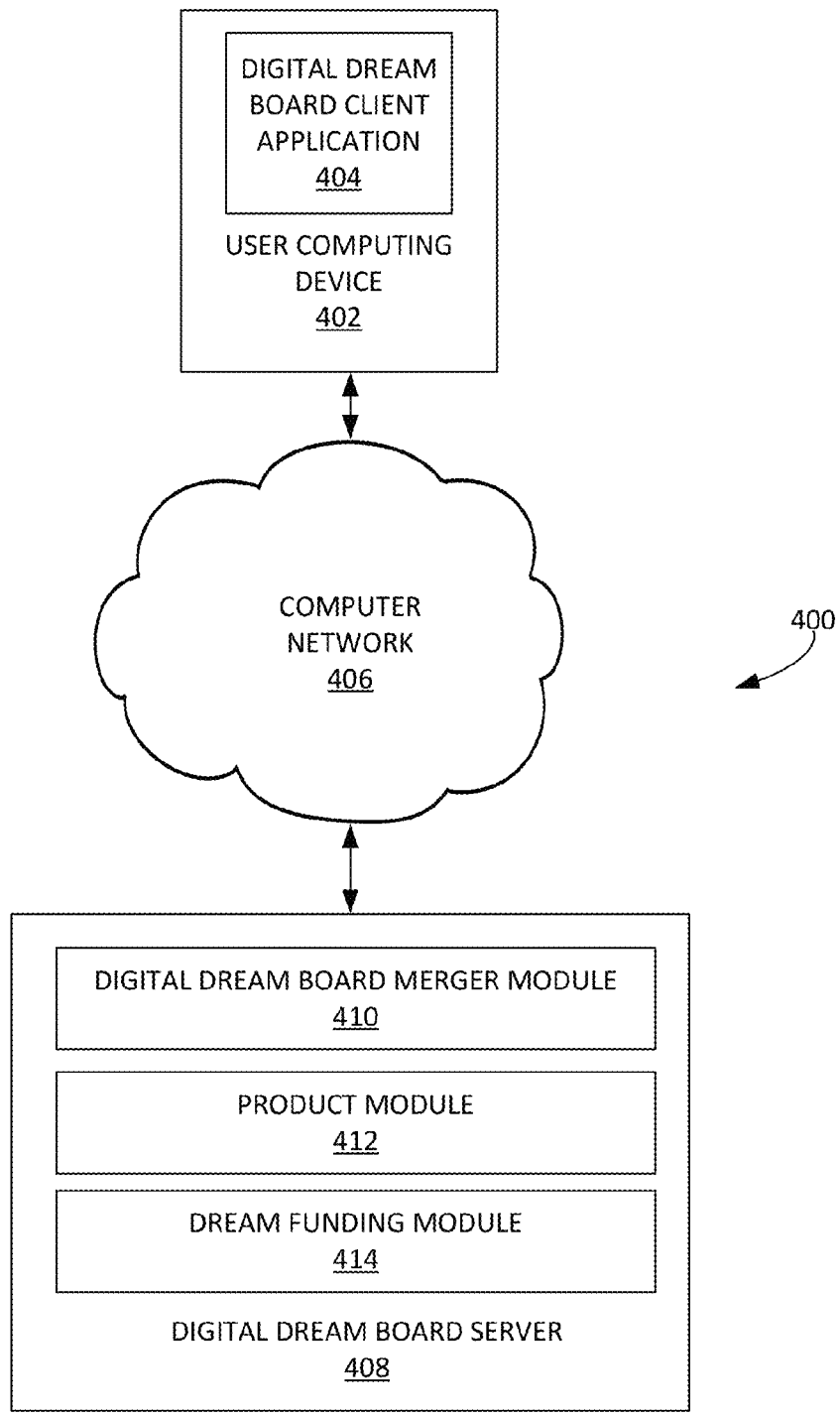
FIG. 4 depicts a computerized system of generating and managing DDBs, according to some embodiments.

FIG. 4 depicts a computerized system 400 of generating and managing DDBs, according to some embodiments. System 400 can include one or more user computing devices 402. A user computing device can include such devices as tablet computers, smart phones, personal computers, laptop computers, scanners, and the like. User computing device can include a DDB client application 404. DDB client application 404 can include computer software designed to help the user to manage and generate DDBs as well as interact with other users of system 400. DDB client application 404 can implement any of the client-side steps of the various processes (such as 100, 200 and/or 300) described herein. DDB client application 404 can communicate with DDB server 408 via computer network 406 (e.g. the Internet).

DDB server 408 can implement any of the server-side steps of the various processes described herein. For example, DDB server can include at least a DDB merger module 410, a product module 412 and/or a funding module 414. DDB merger module 410 can implement the merger of various DDB's as indicated by user to generate one or more new DDBs. For example DDB merger module 410 can utilize the merger functionalities described supra in FIG. 2. Product module 412 can determine various products/services that are related to the subject matter of a particular DDB element. Product module 412 can then include hyperlinks to an online retailer's website in the DDB's GUI. Product module 412 can interact with online retailers and server provider web servers to obtain and provide relevant product information to DDB application users. Dream funding module 414 can manage funding of user intentions and/or dreams as described herein. For example, dream funding module 414 can implement process 300 of FIG. 3. DDB server 408 can implement various other functionalities as well. For example DDB server 408 can manage the server-side aspects of the functionalities depicting in FIGS. 8-17. DDB server 408 can manage communication with online social network API's, financial institutions, etc. In another example, DDB server 408 can manage a module (not shown) that allows experts to provide advice and help user develop DDBs as well as fulfill intentions and/or dreams associated with said DDBs. The module can maintain an expert rating system based on such factors as user feedback (e.g. via 'like' buttons, user input, etc.). DDB server 408 can include one or more modules (not shown) that enable users to: generate DDB-related videos (users can upload videos to DDBs); tag other users' DDBs and/or a portion thereof; bookmark various DDBs; enable users to generate timelines related to dream and/or intention fulfillment; generate and/or manage circles/groups of like-minded users based on such factors as dreams; categories and the like; and/or management of online dream-based social networks.

Figure 5:
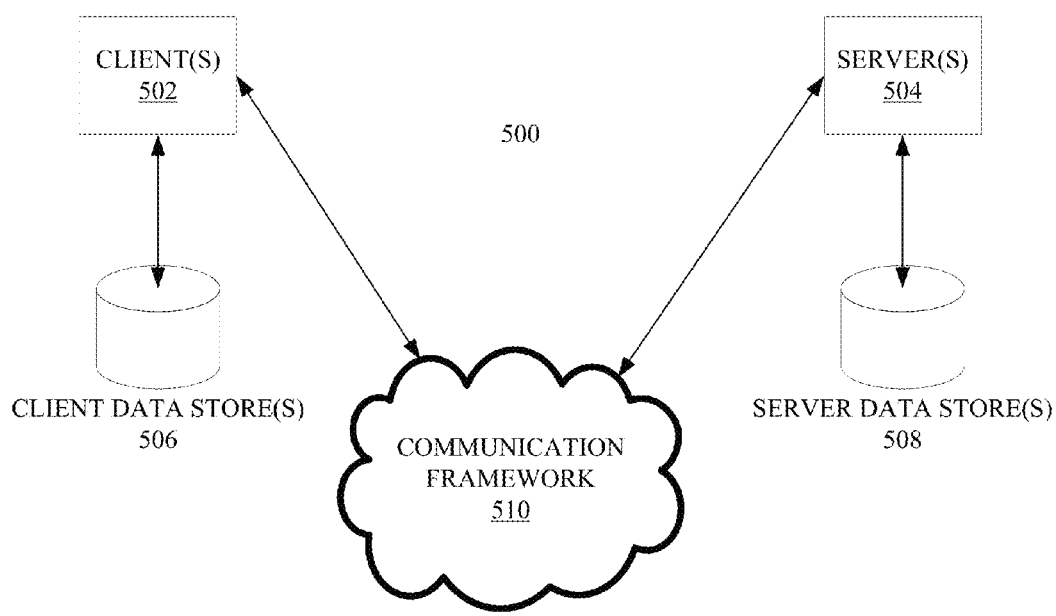
FIG. 5 illustrates a sample computing environment that can be utilized in some embodiments, according to some embodiments.
Figure 6:
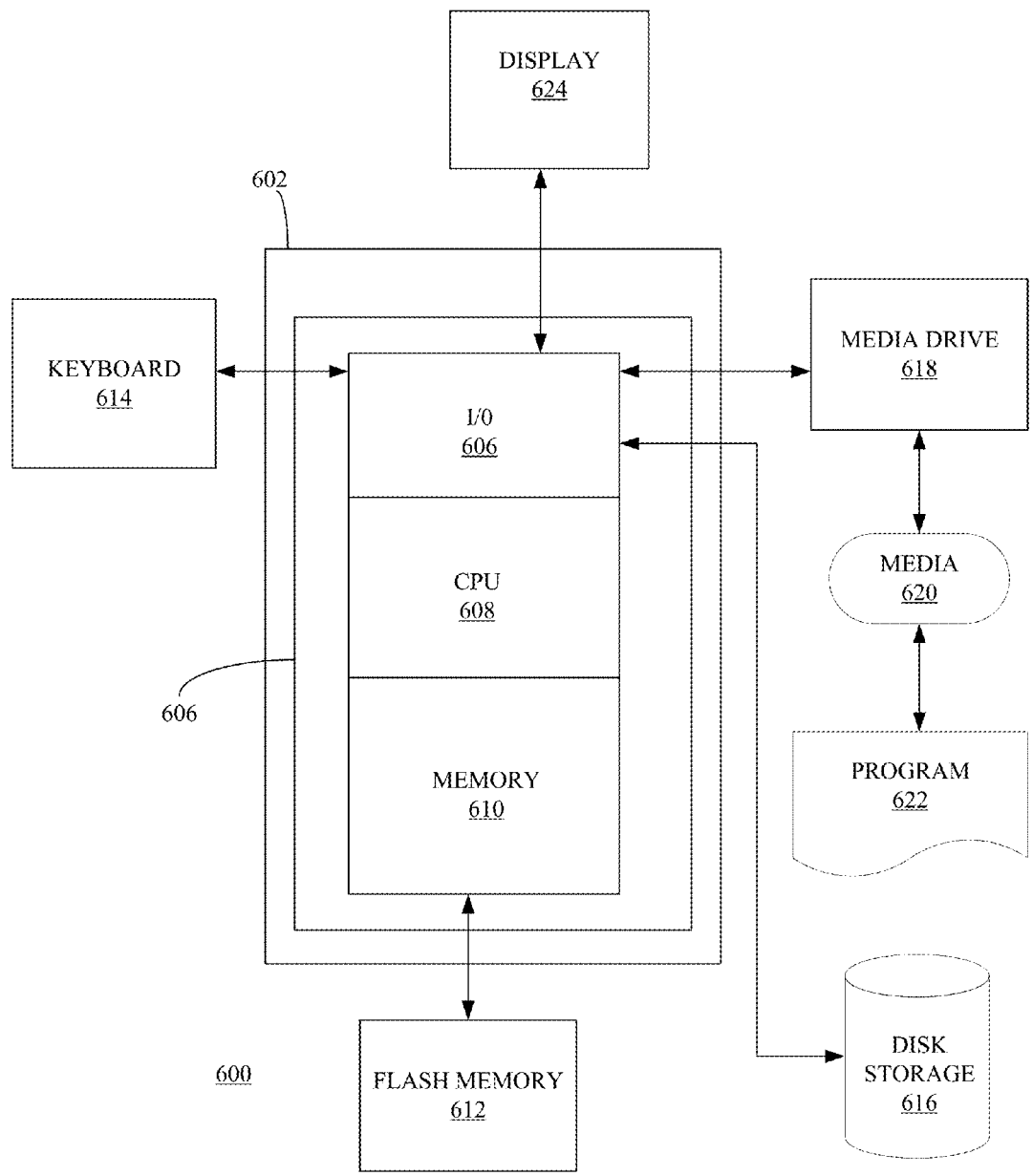
FIG. 6 depicts an exemplary computing system that can be configured to perform any one of the above-described processes, according to some embodiments.

FIG. 5 and FIG. 6 provide exemplary computing environments, devices and architectures for the implementation of the various embodiments discussed herein.

FIG. 5 illustrates a sample computing environment 500 that can be utilized in some embodiments. The system 500 further illustrates a system that includes one or more client(s) 502. The client(s) 502 can be hardware and/or software (e.g., threads, processes, computing devices). The system 500 also includes one or more server(s) 504 (e.g. the DDB server discussed supra). The server(s) 504 can also be hardware and/or software (e.g., threads, processes, computing devices). One possible communication between a client 502 and a server 504 may be in the form of a data packet adapted to be transmitted between two or more computer processes. The system 500 includes a communication framework 310 that can be utilized to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 308 that can be employed to store information local to the server(s) 504.

FIG. 6 depicts an exemplary computing system 600 that can be configured to perform any one of the above-described processes. In this context, computing system 600 may include, for example, a processor, memory, storage, and I/O devices (e.g., monitor, keyboard, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform the above-described processes. The main system 602 includes a motherboard 604 having an I/O section 606, one or more central processing units (CPU) 608, and a memory section 610, which may have a flash memory card 612 related to it. The I/O section 606 is connected to a display 624, a keyboard 614, a disk storage unit 616, and a media drive unit 618. The media drive unit 618 can read/write a computer-readable medium 620, which can contain programs 622 and/or data. Although, not shown, in some embodiments, computing system 600 can include an eye-tracking system and/or be coupled with an eye-tracking system.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language. Computing systems 500 and 600 can be configured to perform the various steps and/or processes provided in the above descriptions of FIGS. 1-5 and 7-17.

Figure 7:
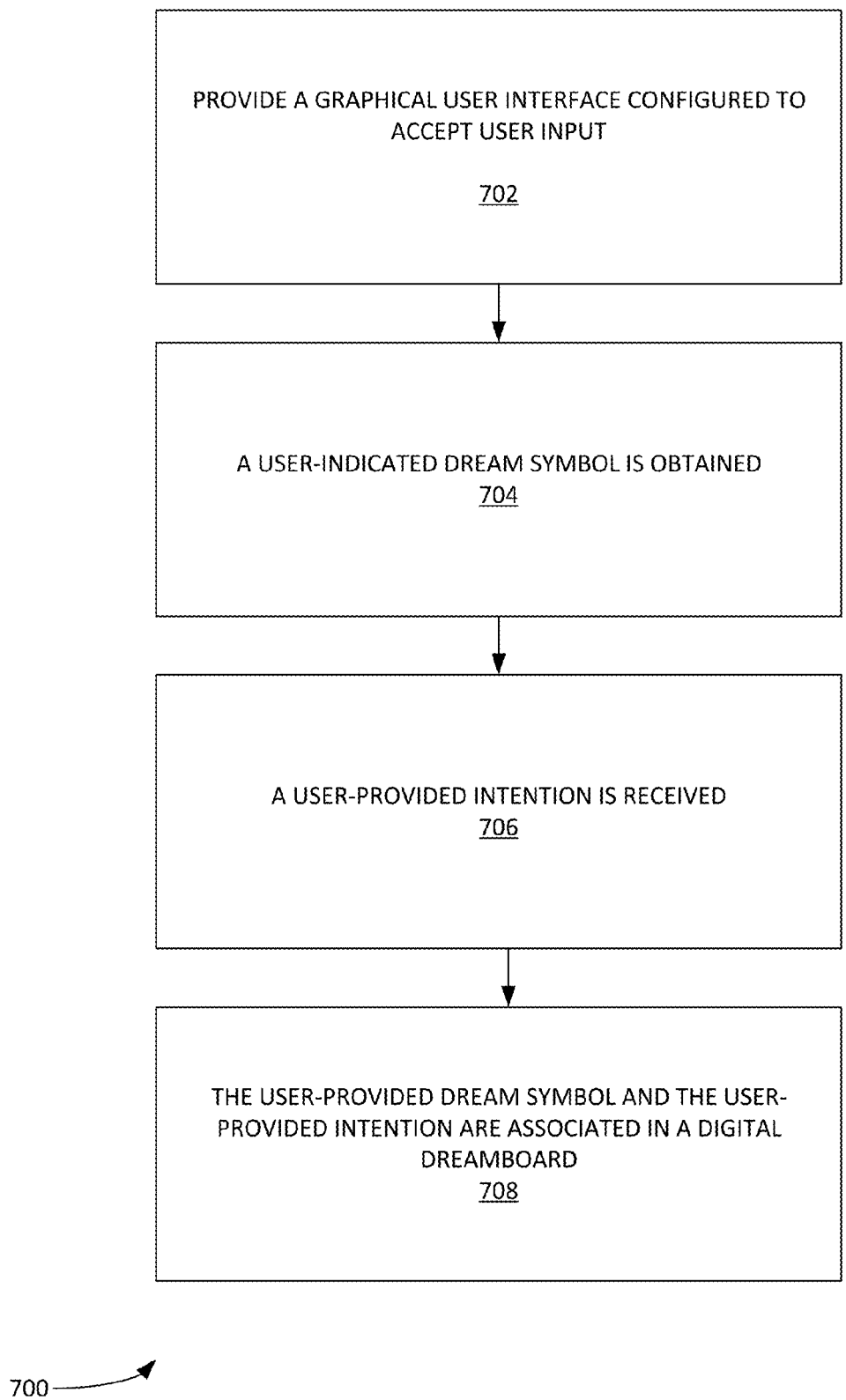
FIG. 7 depicts a process for developing a DDB in an online social network.

FIG. 7 depicts a process 700 for developing a DDB in an online social network. Process 700 include step 702, wherein a computer-implemented method includes the step of providing a graphical user interface configured to accept user input. In step 704, a user-indicated dream symbol is obtained. In step 706, a user-provided intention is received. In step 708, the user-provided dream symbol and the user-provided intention are associated in a digital dreamboard.

Optionally, the digital dreamboard is published to an online social network. Online donations from other members of the online social network related to fulfill the user-provided intention can be obtained. Two or more digital dreamboards may be merged together. A user can invite friends to view the digital dreamboard. A user can indicate a dream symbol by tagging another dream symbol in another user's digital dreamboard.

FIGS. 8-17 illustrate screen shots from a GUI for implementation of some embodiments. More particularly, processes 100, 200 and 300 can be implemented utilizing the various examples provided in FIGS. 8-17.

Figure 8:
FIGS. 8-24 illustrate screen shots of a GUI for implementation of some embodiments.
Figure 9:
Figure 10:
Figure 11:
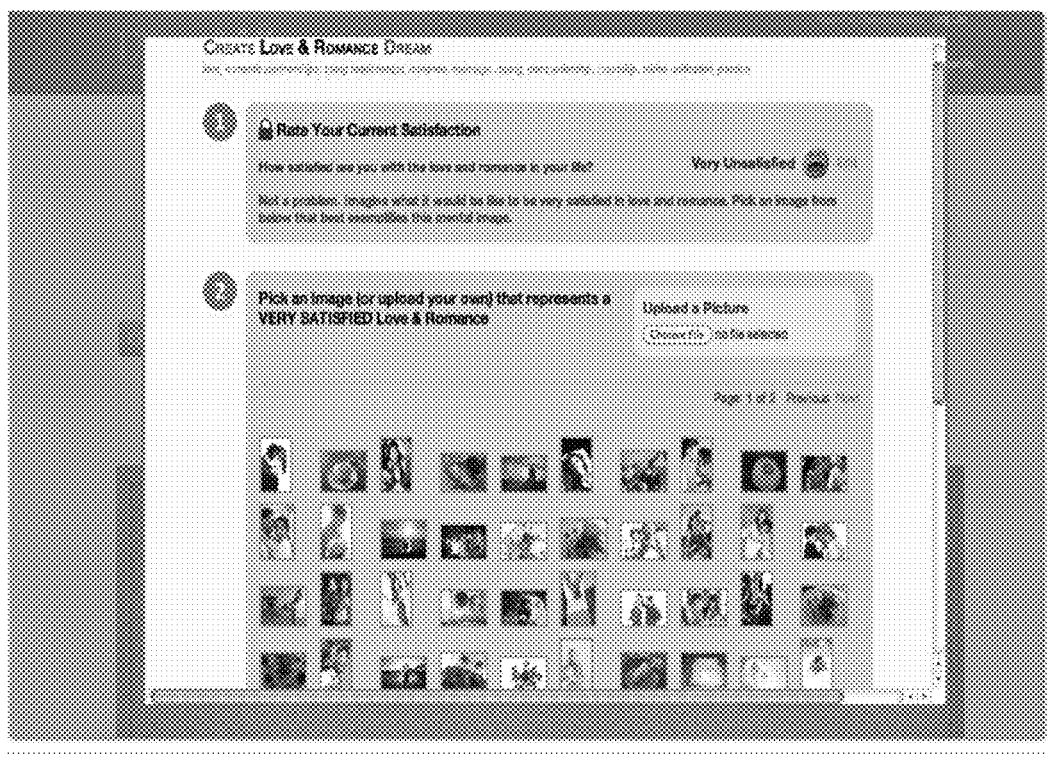
Figure 12:
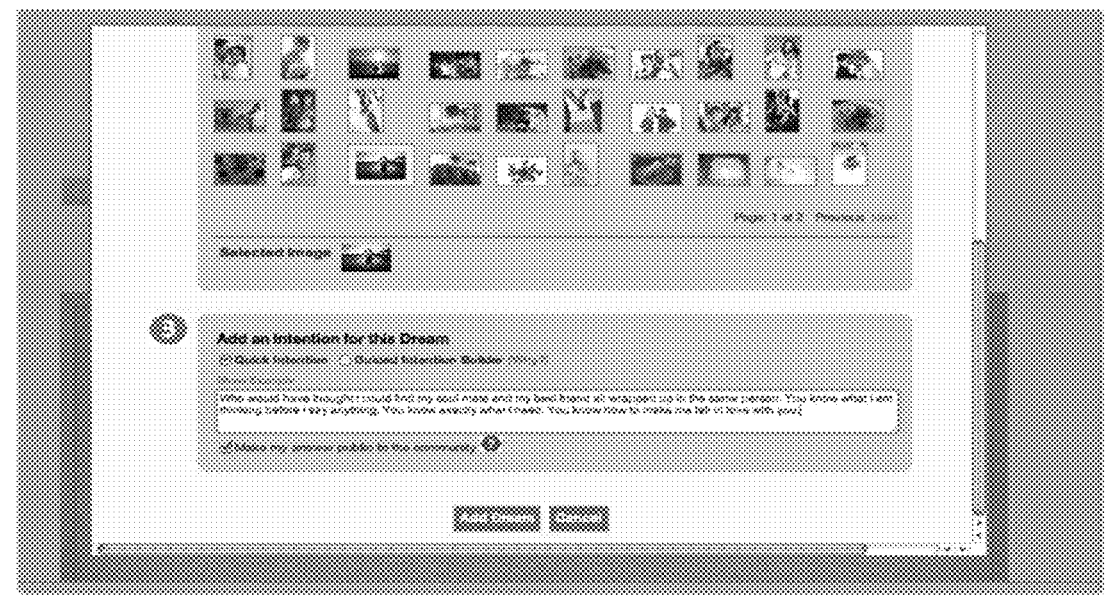
Figure 13:
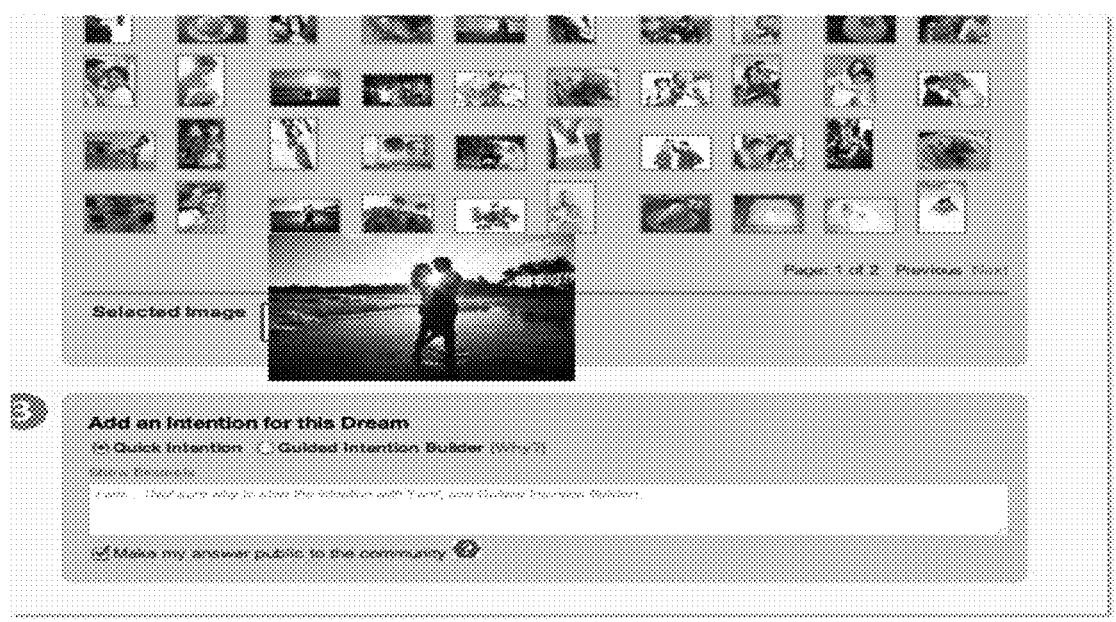
Figure 14:
Figure 15:
Figure 16:
Figure 17:

FIG. 8 depicts a DDB with enhancements. FIG. 9 depicts a DDB with enhancements and intention pop out. FIG. 10 shows a user view in an unguided process in order to upload dreams, images, intentions and/or enhancements without system guidance. FIG. 11 depicts a process to determine a level of user satisfaction. FIG. 12 depicts a user view wherein a user can provide an intention. FIG. 13 depicts an alternate user view wherein a user can provide an intention by answering a series of questions. FIG. 14 and FIG. 15 depict guided intention builder wherein a user follows a step by step process to express the detailed intention for their ideal life in a particular category. FIG. 16 depicts an image on a DDB. FIG. 17 depicts an image with an intention on a DDB. An example process flow for a non-guided DDB generation process can be in the following sequence order: FIGS. 10, 16, 17, 8 then 9. An example process flow for a guided DDB generation process can be in the following sequence order: FIGS. 10, 11, 13, 12, 14, 15, 16, 17, 8 and then 9.

Figure 18:
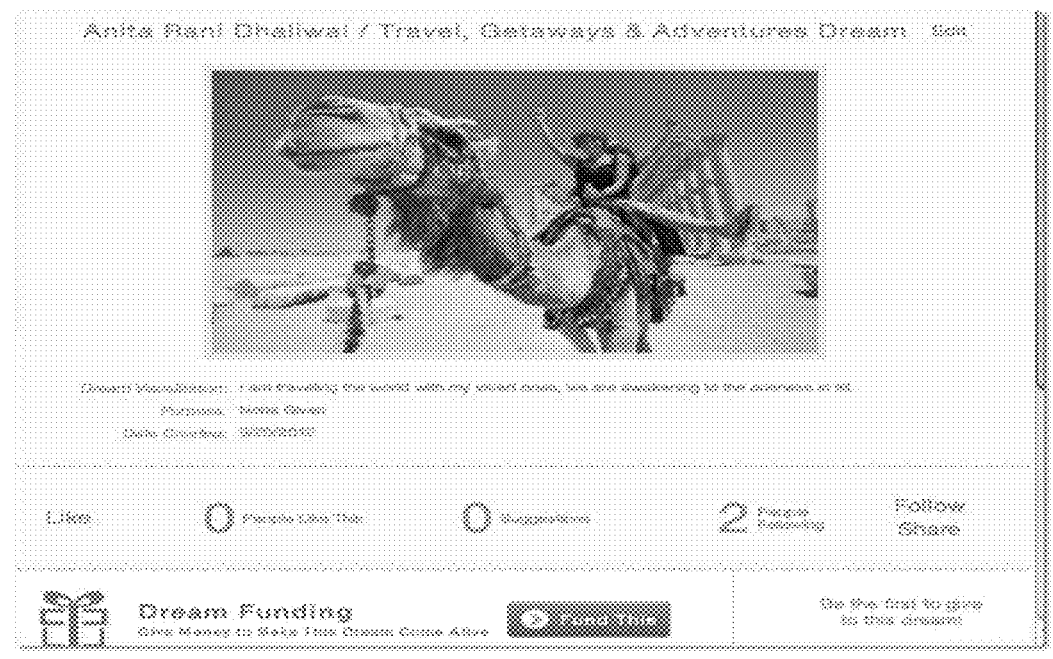
Figure 19:
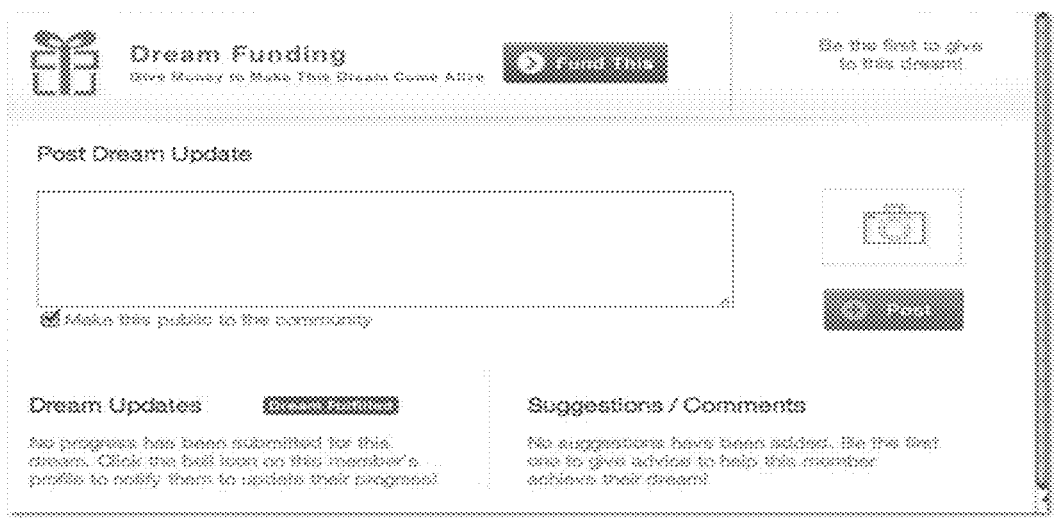
Figure 20:
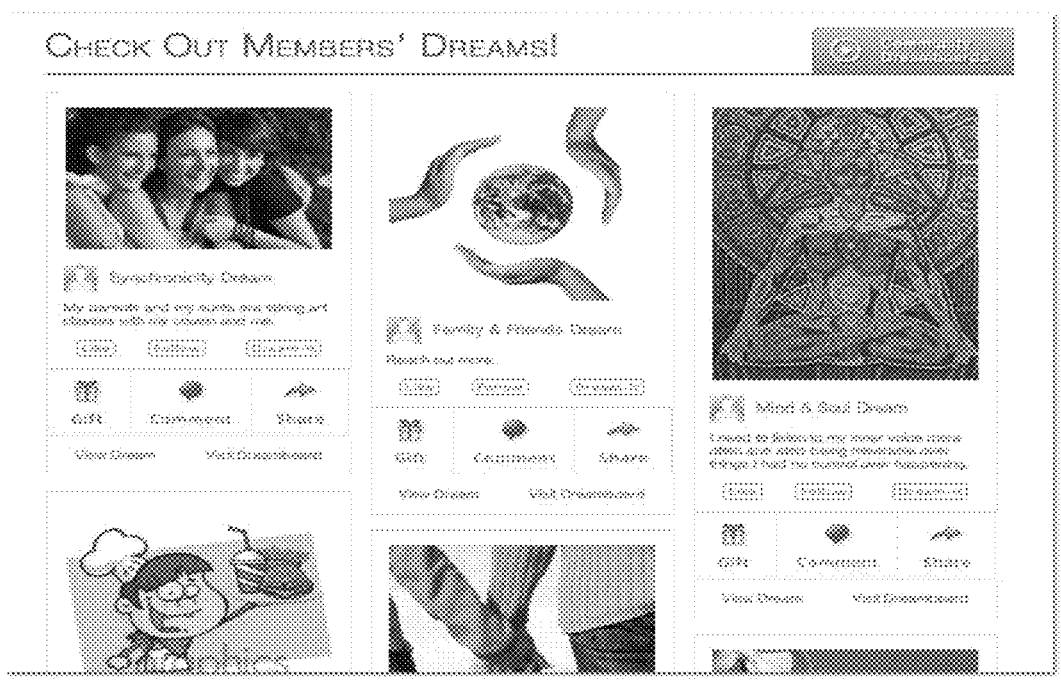
Figure 21:
Figure 22:
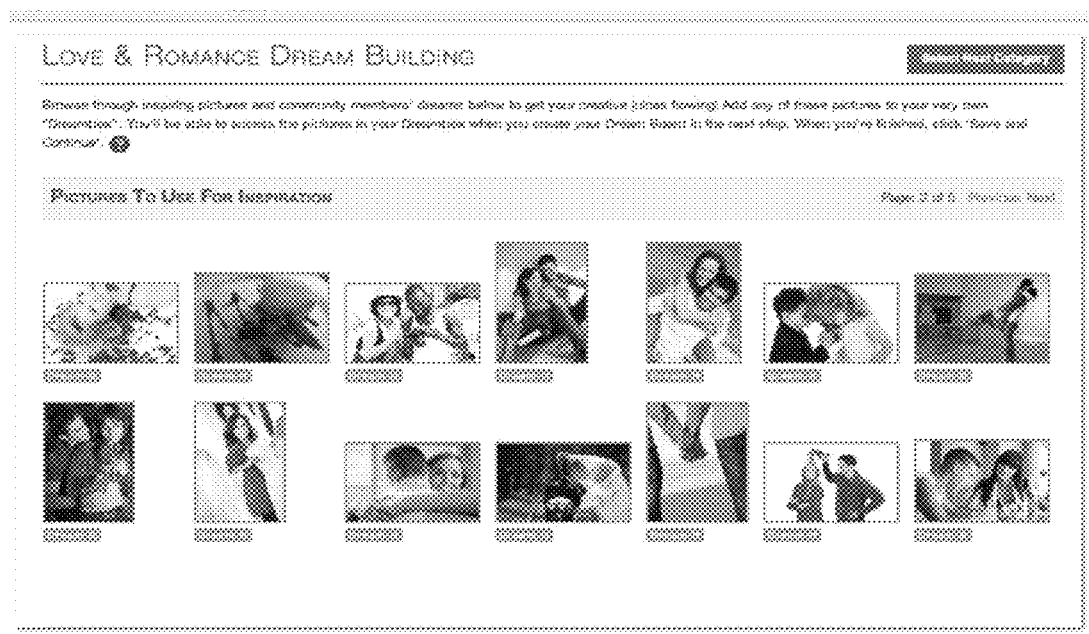
Figure 23:
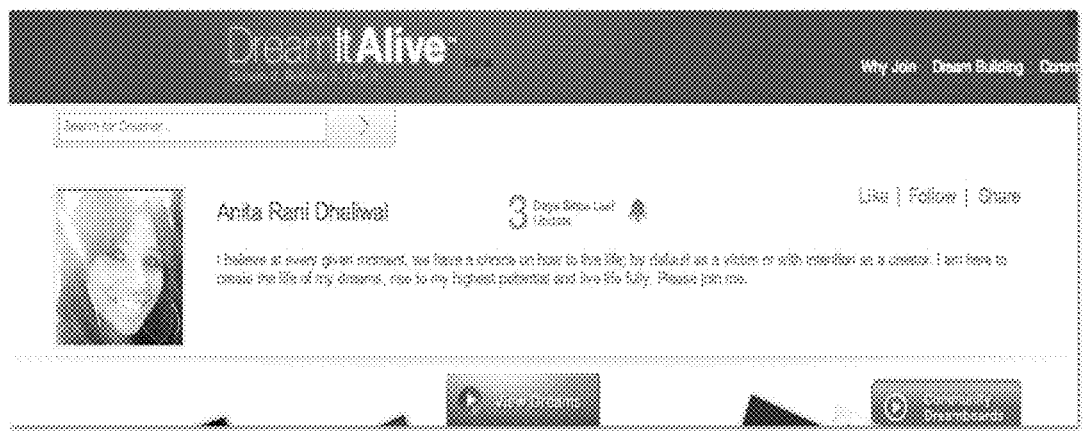
Figure 24:
Figure 24:
Figure 24:
Figure 24:
Figure 24:
Figure 24:
Figure 24:
Figure 24:
Figure 24:
Figure 24:

FIGS. 18-24 illustrate additional screen shots from a GUI for implementation of some embodiments. FIG. 18 depicts a user view with examples of dream details, intention, purpose, likes, follows, and funding opportunity. FIG. 19 depicts a user view with examples of dream funding, updates, suggestions/comments, and picture/video updates. FIG. 20 depicts, inter alia, a community dreams and intentions with an option to implement the 'Dream-It' function. FIG. 21 depicts community updates, activity, dreams, intentions, etc. FIG. 22 depicts dream building functionalities such as dream-it all for inspiration to find your ideal images to create your ideal dreams. FIG. 23 depicts user profile pic, name, about, like, follow, share options, etc. FIG. 24 depicts user's activity.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it will be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computer-implemented method comprising:
    providing a graphical user interface configured to accept user input;
    obtaining, with at least one computer processor, a user-indicated dream symbol;
    receiving a user-provided intention;
    associating the user-provided dream symbol and the user-provided intention in a digital dreamboard;
    associating a product with a digital dreamboard, wherein the product is related to fulfill the intention associated with the digital dreamboard, wherein another user can provide funding to purchase the product associated with the digital dreamboard;
    obtaining a plurality of digital dreamboards from a plurality of users;
    enabling, with at least one computer processor, at least one user to merge two or more digital dreamboards with a drag and drop operation, wherein at least one digital dreamboard of the two or more digital boards belongs to another user, and wherein a merger of the two or more digital dreamboards comprises,
    identifying a set of common elements between the two or more digital dreamboards, and
    generating a merged dreamboard that comprises the set of common elements between the two or more digital dreamboards;
    providing the merged dreamboard to a life coach;
    providing a suggestion to the at least one user to connect with the other user of the plurality of users as a possible love interest based on the two or more digital boards; and
    providing an inspirational information from the life coach, wherein the inspirational information is relevant to at least one dream included in the merger of the two or more digital dreamboards.

2. The computer-implemented method of claim 1, wherein the user indicated dream symbol comprises at least one of a text description, digital image or a digital video.

3. The computer-implemented method of claim 1, wherein the user-provided intention is generated from a set of user-responses to a set of dream-related questions.

4. The computer-implemented method of claim 3, wherein the set of dream-related questions comprise a question that accesses a user emotion that the user associates with the user-indicated dream symbol.

5. The computer-implemented method of claim 1 further comprising:
    defining an online social network comprising one or more digital dreamboard users.

6. The computer-implemented method of claim 5, wherein one or more users are connected in the online social network based on a set of common digital dreamboard attributes.

7. The computer-implemented method of claim 1, wherein the digital dreamboard comprises a plurality of user-indicated dream symbols and a plurality of user-provided intentions.

8. A system for generating and managing digital dreamboards comprising:
    a plurality of user computing devices;
    at least one hosting computing device in communication with the plurality of user computing device, the hosting computing device having a processor operable for use in displaying a graphical user interface for use in:
        providing a graphical user interface configured to accept user input;
        obtaining, with at least one computer processor, a user-indicated dream symbol;
        receiving a user-provided intention;
        associating the user-provided dream symbol and the user-provided intention in a digital dreamboard;
        associating a product with a digital dreamboard, wherein the product is related to fulfill the intention associated with the digital dreamboard, wherein another user can provide funding to purchase the product associated with the digital dreamboard;
        enabling a user to merge two or more digital dreamboards with a drag and drop operation, wherein at least one digital dreamboard of the two or more digital boards belongs to another user, and wherein a merger of the two or more digital dreamboards comprises,
            identifying a set of common elements between the two or more digital dreamboards, and
        generating a merged dreamboard that comprises the set of common elements between the two or more digital dreamboards;
        providing the merged digital dreamboard to a life coach; and
        providing an inspirational information from the life coach, wherein the inspirational information is relevant to at least one dream included in the merger of the two or more digital dreamboards.

9. The system of claim 8, wherein the digital dreamboard is published to an online social network.

10. The system of claim 9, wherein the at least one hosting computing device in communication with the plurality of user computing device, the hosting computing device having the processor operable for use in displaying a graphical user interface for use in:
    obtaining online donations from other members of the online social network related, to fulfill the user-provided intention.

11. The system of claim 9, wherein a user is enabled to indicate a real-world object to include a user-indicated dream symbol.

12. The system of claim 9, wherein a user is enabled to invite friends to view the digital dreamboard.

13. The system of claim 12, wherein a user indicates a dream symbol tagging another dream symbol in another user's digital dreamboard.

* * * * *